April 14, 1970     H. F. CANTWELL     3,505,817
VALVE CONTROL APPARATUS

Filed March 21, 1968     2 Sheets-Sheet 1

Inventor
Hugh Francis Cantwell
By Cushman, Darby & Cushman
Attorneys

United States Patent Office 3,505,817
Patented Apr. 14, 1970

3,505,817
VALVE CONTROL APPARATUS
Hugh Francis Cantwell, Derby, England, assignor to Rolls-Royce Limited, Derby, England, a British company
Filed Mar. 21, 1968, Ser. No. 714,981
Claims priority, application Great Britain, Apr. 7, 1967, 16,151/67
Int. Cl. F02k 3/02; F04d 27/00; F15c 1/14
U.S. Cl. 60—226                                                  10 Claims

ABSTRACT OF THE DISCLOSURE

A valve control apparatus comprises two butterfly valves through which compressor bleed air from a gas turbine engine compresor is directed into a dump outlet. Three jet fluid elements are provided to direct air under pressure from a source into a particular one of two outlet channels when the compressor bleed pressure is greater than a predetermined valve, and into the other channel when the bleed pressure is less than said predetermined value. There is also provided a pressure-responsive valve which is responsive to air pressure in one of the channels and which controls the two butterfly valves so that the compressor bleed air is directed into the dump duct when the bleed pressure is greater than the predetermined value and into the outlet when the bleed pressure is less than the predetermined value.

---

Figure 1:
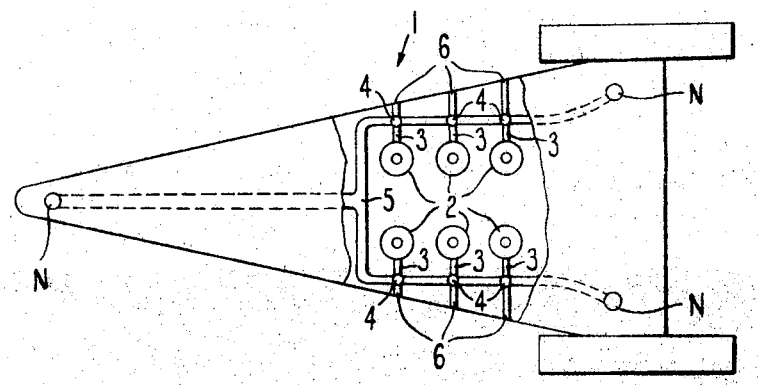

This invention relates to valve control apparatus and more particularly to apparatus for controlling compressed air bleed and dump valves in a gas turbine engine.

According to the present invention there is provided valve control apparatus comprising a valve device through which compressor bleed air from a gas turbine engine compressor may be directed into a compressed air duct or an outlet respectively, at least one fluid jet element adapted to direct fluid under pressure from a source into a particular one of two outlet channels when the compressor bleed pressure is greater than a predetermined value and into the other channel when the bleed pressure is less than said predetermined value, and pressure-responsive valve actuating means responsive to fluid pressure in at least one of said channels and adapted to control the valve device in accordance therewith so that the compressor bleed air is directed into said duct when the bleed pressure is greater than said predetermined value and into the outlet when the bleed pressure is less than said predetermined value.

The fluid jet element preferably employs two opposed control jets of air bled respectively from the compressor and from the compressed air duct downstream of the valve device, the valve actuating means being operative to cause the compressor bleed air to be directed into the outlet when the compressor bleed pressure is substantially less than the pressure in said compressed air duct.

Said particular one of the outlet channels is preferably connected to the pressure-responsive valve actuating means by way of a fluid pressure amplifier device, fluid flowing through said outlet channel being formed into a jet which directs pressure fluid into a fluid pressure inlet of said actuating means.

A pressure-sensitive element may be disposed between the said particular one of the outlet channels and the pressure-responsive valve actuating means, said pressure-sensitive element being responsive to the ratio between the compressor inlet and compressor bleed pressures and being adapted to cut off the pressure fluid connection from said channel to the actuating means when the said ratio falls below a predetermined value.

The invention is particularly applicable to power plant installations comprising a plurality of gas turbine engines, in which compressor bleed air from each gas turbine engine is supplied to a common duct. In such an installation the compressed air duct of the apparatus would form part of said common duct. The valve control apparatus of each engine is then operative to isolate the respective compressor bleed from the common duct until the compressor bleed pressure is greater than or equal to the pressure in the common duct. Some engines, particularly engines used for producing direct lift forces on aircraft, are designed to operate efficiently only when compressor bleed is maintained, and a simple shut-off valve would in such cases be unsatisfactory as compressor surge could result when the bleed was discontinued; the apparatus of the present invention ensures that while the compressor bleed pressure is less than the pressure in the common duct the compressor bleed from the respective engine is "dumped" through the respective outlet. In this way a reverse flow of compressed air from the common duct into the respective engine is effectively prevented, while at the same time a compressed air bleed from each engine is ensured whether or not the engine is in communication with the common duct.

Figure 2:
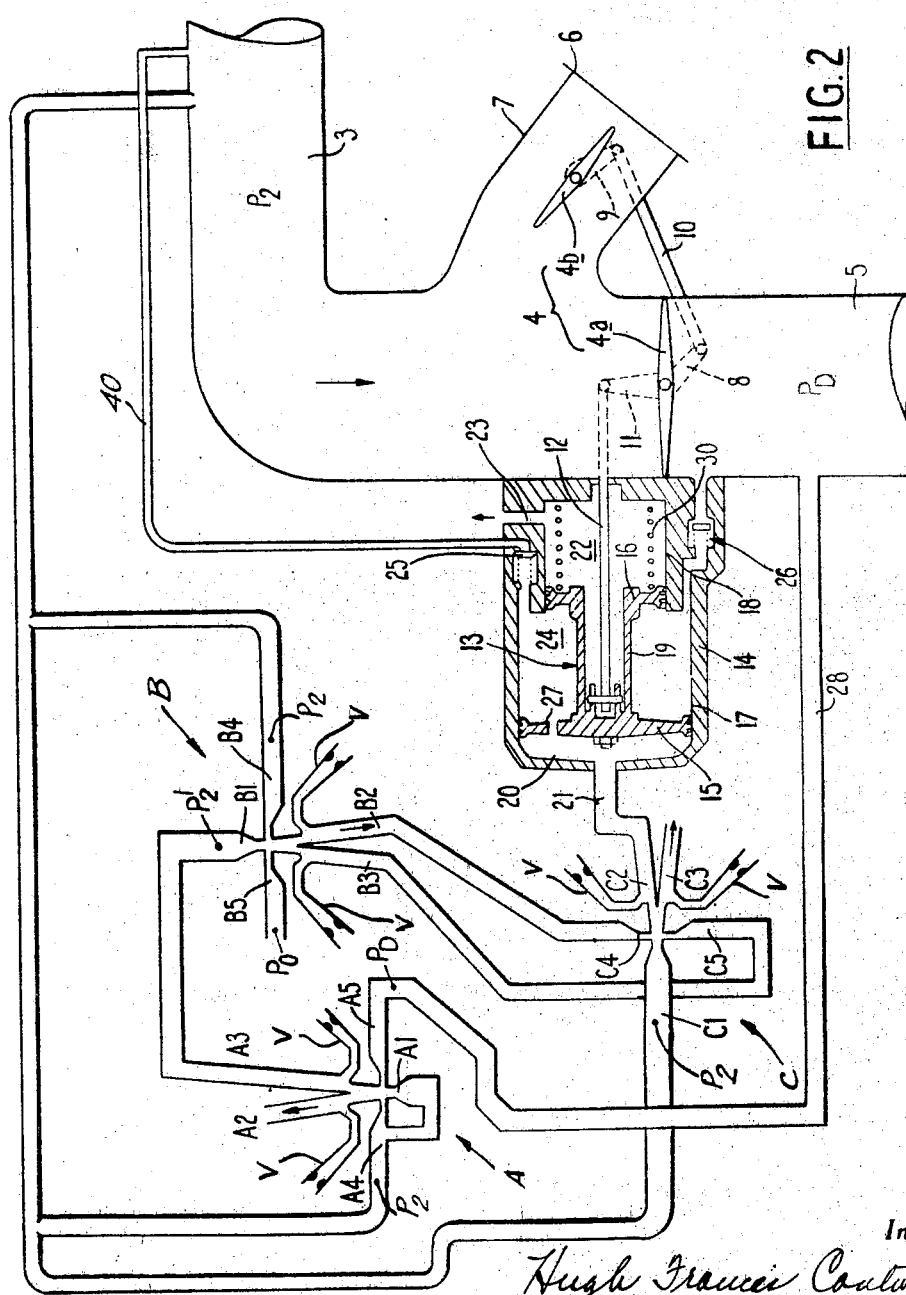

The invention will be described, merely by way of example, with reference to the accompanying drawings, in which:

FIGURE 1 is a diagrammatic plan view, partly broken away, of an aircraft provided with a plurality of engines incorporating the present invention, and FIGURE 2 illustrates diagrammatically one arrangement of apparatus according to the invention.

Refering to FIGURE 1 an aircraft 1 is provided with a plurality of gas turbine jet engines 2. The engines 2 may be vertically mounted direct lift engines, as illustrated, or may be forward propulsion engines.

Each engine 2 is provided with a respective compressor bleed duct 3 through which a proportion of air at the delivery pressure $P_2$ of the or a respective compressor of the engine is directed. Each bleed duct 3 communicates through a respective two-way valve device 4 with a common compressed air duct 5. Compressed air in the duct 5 is used for auxiliary pruposes such, for example, as the energisation of "blown" flaps (not shown) or attitude control nozzles N. Each engine 2 further has a respective compressed air vent or dump outlet 6.

Each valve device 4 has a first setting in which it provides open communication between the respective bleed duct 3 and the common duct 5, and in which it closes the respective vent or dump outlet 6, and a second setting in which it provides open communication between the respective bleed duct 3 and the vent or dump outlet 6, isolating the bleed duct 3 from the common duct 5.

The apparatus for controlling one of the valve devices 4 is illustrated diagrammatically in FIGURE 2. Part of the bleed duct 3 of one of the engines is shown, together with the respective vent or dump outlet 6 and part of the common compressed air duct 5.

The valve device 4 comprises two interconnected butterfly valve members 4a, 4b disposed respectively at the entrance of the common duct 5 and in a short duct 7 leading to the vent or dump outlet 6. Externally of the ducts 5, 7 the respective spindles on which the valve members 4a, 4b are mounted are provided with respective crank arms 8, 9 (shown in broken lines) which are interconnected at their outer ends by a link 10. A further crank arm 11 extends from the spindle of the valve member 4a and is pivotally connected at its outer end to one end of a piston rod 12. The mechanical interconnection of the valve members 4a, 4b will be seen to be such that, when the valve member 4a fully closes the common duct 5, the valve member 4b is fully open, permitting compressed air from the bleed duct 3 to exhaust to atmospheres through the vent or dump outlet 6 and, conversely, when the valve member 4b is fully closed, the valve member 4a is fully open, permitting compressed air from the bleed duct 3 to pass into the common duct 5.

The arrangement of the valve device 4 in this embodiment is essentially similar to that described in our British patent specification No. 950,015, particularly with reference to FIGURE 4 thereof.

Simultaneous movement of the valve members 4a, 4b is effected by translational movement of the piston rod 12. The piston rod 12 is attached at its end remote from the crank arm 11 to a piston assembly 13 which is mounted for sliding movement in a housing 14. The piston assembly 13 comprises two pistons 15, 16 of different area which slide in respective cylindrical bores 17, 18 in the housing 14 and which are interconnected by a sleeve 19.

The two pistons 15, 16 divide the interior of the housing 14 into three spaces. The space 20 at the end of the housing 14 adjacent the piston 15 communicates with an inlet 21; the space 22 at the other end of the housing 14 enclosed by the sleeve 19 and piston 16 communicates through a vent 23 with atmosphere, and the intermediate space 24 between the pistons 15, 16 communicates with the compressor bleed duct 3 through a conduit 40 having a non-return valve 25 therein and with the common duct 5 through a non-return valve 26. The space 24 also communicates with the space 20 through an orifice 27 of restricted area in the piston 15.

Movement of the piston assembly 13 in the housing 14 is controlled by the fluid jet elements generally designated at A, B, and C and shown diagrammatically in FIGURE 2. Each fluid jet element is of substantially the same design, and corresponding parts will be identified by the same reference numeral with the prefix A, B or C as the case may be. The elements have respective fluid jet input channels A1, B1, C1 and two respective output channels A2, A3, B2, B3, and C2, C3. Disposed between the input and output channels is a respective pair of control jet channels A4, A5; B4 B5, and C4, C5 disposed on opposite sides of the respective control elements. Fluid pressures are applied to the respective control channels A4, A5; B4, B5; C4, C5 to direct the fluid jet flowing from the respective input channel A1, B1, C1 into one or other of the two respective output channels A2, A3; B2, B3 or C2, C3. Each fluid jet element is monostable, that is to say, it is constructed so that, in the absence of any control pressures applied at the respective control channels, the fluid jet emitted by the respective input channel flows into one particular output channel. The elements A, B, C in this apparatus are constructed so that in their stable states the respective fluid jets from the input channels A1, B1, C1 are directed into the respective output channels A2, B2, C3 respectively, as indicated by arrows.

Each output channel of the fluid jet elements A, B, C is provided with a respective outlet vent $v$ which is arranged to vent to atmosphere any fluid jet flowing in the reverse direction in the respective outlet channel, that is, towards the respective input channel.

The output channel A3 of element A is connected to the input channel B1 of element B, and the respective output channels B2, B3 of element B are connected to the respective control channels C4, C5 of element C. The output channel C2 of element C is connected to the inlet 21 of the housing 14. The input channel A1 of element A is connected to one of the control channels A4 thereof, which is in turn connected to the respective compressor bleed duct 3 and receives air at the compressor delivery pressure $P_2$. The other control channel A5 of element A is connected through a conduit 28 to the common duct 5 downstream of the respective valve element 4a and receives compressed air at a pressure $P_D$, being the pressure in the duct 5. The control channel B4 of element B is also connected to the bleed duct 3 and receives air at the compressor delivery pressure $P_2$, while its other control channel B5 is connected to the compressor inlet and receives air at the compressor inlet pressure $P_0$. The inlet channel C1 of element C is connected to the bleed duct 3 and therefore receives air at the compressor delivery pressure $P_2$.

A thrust spring 30 is housed in the space 22 of the housing 14 and urges the piston assembly 13 towards the inlet 21, that is, to the left in FIGURE 2. In the absence, therefore, of any fluid pressure at the inlet 21, the apparatus will be in the setting shown in FIGURE 2, in which the valve member 4a is fully closed and the valve member 4b fully opens. Bleed air from the respective compressor bleed duct 3 is therefore dumped to atmosphere through the vent or dump outlet 6, the bleed duct 3 being isolated from the common duct 5.

As long as the compressor delivery pressure $P_2$ of the respective compressor is less than the pressure $P_D$ in the common duct 5 the fluid jet element A will remain in its stable state, with its respective fluid jet passing through the output channel A2. As soon as the pressure $P_2$ is equal to or greater than the duct pressure $P_D$ the fluid jet will be deflected by the relative pressures applied at the respective control channels A4, A5 into the output channel A3, therefore providing an input pressure $P_2'$ at the input channel B1 of element B. Element B is, therefore, then energised.

The construction of element B will be seen, however, to be such that a fluid pressure output is normally applied to the output channel B2 but is switched to the other output channel B3 only when the compressure delivery pressure $P_2$ applied to the control channel B4 exceeds by a predetermined amount the compressor inlet pressure $P_0$ applied to the control channel B5. Element B is arranged so that it is changed from its stable condition only when the ratio $P_2/P_0$ reaches a predetermined minimum value (irrespective of the ratio $P_2/P_D$) appropriate to its normal working range. Changeover of the outputs of element B from channel B2 to channel B3 therefore occurs only when (i) the respective ratio $P_2/P_0$ reaches a certain minimum value, and (ii) the ratio $P_2/P_D$ has a certain predetermined value (in this example, unity).

The application of fluid pressure to output channel B3 and its simultaneous removal from output channel B2 of element B causes the control pressures applied to element C to be effectively reversed, resulting in the output of element C being applied to its output channel C2 and thus to the inlet 21.

The element C acts effectively as a fluid pressure amplifier, and the pressure applied to the inlet 21 when element C operates as described above is substantially equal to the compressor delivery pressure $P_2$. The piston assembly 13 is, therefore, urged to the right in the housing 14, air being expelled from the space 24 through the orifice 27 in the piston 15. The piston rod 12 is therefore moved to the right, opening the valve member 4a and simultaneously closing the valve member 4b so that the respective compressor bleed duct 3 is put into communication with the common duct 5 and the respective bleed vent or dump outlet 6 is closed.

If during operation of the engines 2 the compressor delivery pressure $P_2$ of one particular engine should fall below the common duct pressure $P_D$, due, for example to this engine "lagging" behind the other engines on starting, the element A will remain in its stable condition, in which its output pressure is applied to channel A2, and fluid pressure will be removed from the inlet channel B1 of element B. The element C will therefore remain in its stable condition, in which fluid pressure is applied to its output channel C3, and the input 21 will effectively be vented to atmosphere throught the other output channel C2 and its respective vent $v$. The piston assembly 13 will be moved rapidly to the left under the influence of the spring 30, reverting to the postion shown in FIGURE 2. This movement of the piston assembly 13 will be assisted by compressed air applied to the space 24 through the non-return valve 25 or the non-return valve 26 (depending on which of the pressures $P_2$, $P_D$ is the higher). The valve member 4a is therefore closed, isolating the respective bleed duct 3 from the common duct 5 and therefore preventing the feeding of compressed air into the respective engine from the bleed ducts of the other engines. At the same time the valve member 4b is opened, enabling the respective bleed duct 3 to be vented to atmosphere through the vent or dump outlet 6. The required bleed of compressed air from the respective engine is therefore maintained, this being desirable to maintain the compressor of the respective engine in its normal operating range and prevent its surging.

We claim:

1. A valve control apparatus for use with a gas turbine engine having a compressor, said apparatus comprising: means for receiving air bled from the compressor of the gas turbine engine; a valve device operably connected to said means; a compressed air duct and a vent outlet, said valve device being operable to direct compressor bleed air from said means into said compressed air duct or into said vent outlet; pressure-responsive actuating means for operating said valve device; at least one fluid jet element for controlling said pressure-responsive actuating means; and a source of pressure fluid for said fluid jet element, said fluid jet element including two outlet channels and two opposed control jets of air bled respectively from the compressor and from said compressed air duct downstream of said valve device for controlling flow of pressure fluid from said source to said two outlet channels, a particular one of said two outlet channels receiving pressure fluid from said source when pressure of the compressor bleed air is greater than a predetermined value and the other of said channels receiving pressure fluid from said source when pressure of the compressor bleed air is less than the predetermined value, said pressure-responsive valve actuating means being responsive to fluid pressure in at least one of said channels to cause compressor bleed air to be directed into said vent outlet when pressure of the compressor bleed air is substantially less than pressure in said compressed air duct and into said compressed air duct when pressure of the compressor bleed air is greater than said predetermined value.

2. Apparatus as claimed in claim 1 in which the said particular one of the outlet channels is connected to the pressure-responsive valve actuating means by way of a fluid pressure amplifier device, fluid flowing through said outlet channel being formed into a jet which directs pressure fluid into a fluid pressure inlet of said actuating means.

3. Apparatus as claimed in claim 1 in which a pressure-sensitive element is disposed between the said particular one of the outlet channels and the pressure-responsive valve actuating means, said pressure-sensitive element being responsive to the ratio between the compressor inlet and compressor bleed pressures and being adapted to cut off the pressure fluid connection from said channel to the actuating means when the said ratio falls below a predetermined value.

4. Apparatus as claimed in claim 1 in which the pressure fluid source comprises a compressed air bleed from the engine compressor.

5. Apparatus as claimed in claim 1 in which the pressure-responsive valve actuating means comprises a piston slidable within a cylinder.

6. Apparatus as claimed in claim 5 in which said cylinder defines at least one chamber having a fluid pressure inlet, a biasing spring in said cylinder, the piston being movable in response to fluid pressure at said inlet against the action of the biasing spring which urges the piston into a position in which the compressor bleed air is directed into the vent outlet.

7. Apparatus as claimed in claim 1 in which the valve device comprises two mechanically interconnected valve members disposed in the compressed air duct and in a duct provided with said outlet respectively and arranged so that when one valve member fully closes its respective duct the other duct is fully opened by its respective valve member.

8. A power plant arrangement comprising:
a plurality of gas turbine engines, each having a compressor; each of said gas turbine engines having a valve control apparatus for use therewith, each of said valve control apparatuses including means for receiving air bled from the compressor of the gas turbine engine, a valve device operably connected to said means, a compressed air duct and a vent outlet, said valve device being operable to direct compressor bleed air from said means into said compressed air duct or into said vent outlet, pressure-responsive actuating means for operating said valve device, at least one fluid jet element for controlling said pressure responsive actuating means, and a source of pressure fluid for said fluid jet element, said fluid jet element including two outlet channels and two opposed control jets of air bled respectively from the compressor and from said compressed air duct downstream of said valve device for controlling flow of pressure fluid from said source to said two outlet channels, a particular one of said two outlet channels receiving pressure fluid from said source when pressure of the compressor bleed air is greater than a predetermined value and the other of said channels receiving pressure fluid from said source when pressure of the compressor bleed air is less than the predetermined value, said pressure-responsive valve actuating means being responsive to fluid pressure in at least one of said channels to cause compressor bleed air to be directed into said vent outlet when pressure of the compressor bleed air is substantially less than pressure in said compressed air duct and into said compressed air duct when pressure of the compressor bleed air is greater than said predetermined value; and a common duct operatively connected to each compressed air duct of each valve control apparatus for receiving compressed air therefrom.

9. A valve control apparatus for use with a gas turbine engine having a compressor, said apparatus comprising; means for receiving air bled from the compressor of the gas turbine engine; a valve device operably connected to said means; a compressed air duct and a vent outlet, said valve device being operable to direct compressor bleed air from said means into said compressed air duct or into said vent outlet; pressure-responsive actuating means for operating said valve device; at least one fluid jet element for controlling said pressures responsive actuating means; and a source of pressure fluid for said fluid jet element, said fluid jet element including two outlet channels, a particular one of said two outlet channels receiving pressure fluid from said source when pressure of the compressor bleed air is greater than a predetermined value and the other of said channels receiving pressure fluid from said source when pressure of the compressor bleed air is less than the predetermined value; a fluid pressure amplifier device connected between the particular one of said outlet channels and said pressure-responsive valve actuating means, fluid flowing through said outlet channel being formed into a jet in said fluid pressure amplifier device which directs pressure fluid from said fluid pressure amplifier device into a fluid pressure inlet of said pressure-responsive valve actuating means, said pressure-responsive valve actuating means being responsive to fluid pressure in at least one of said channels to cause compressor bleed air to be directed into said vent outlet when pressure of the compressor bleed air is substantially less than pressure in said compressed air duct and into said compressed air duct when pressure of the compressor bleed air is greater than said predetermined value.

10. A valve control apparatus for use with a gas turbine engine having a compressor, said apparatus comprising: means for receiving air bled from the compressor of the gas turbine engine; a valve device operably connected to said means; a compressed air duct and a vent outlet, said valve device being operable to direct compressor bleed air from said means into said compressed air duct or into said vent outlet; pressure-responsive actuating means for operating said valve device; at least one fluid jet element for controlling said pressure responsive actuating means; and a source of pressure fluid for said fluid jet element, said fluid jet element including two outlet channels, a particular one of said two outlet channels receiving pressure fluid from said source when pressure of the compressor bleed air is greater than a predetermined value and the other of said channels receiving pressure fluid from said source when pressure of the compressor bleed air is less than the predetermined value; a pressure-sensitive element disposed between said particular one of said outlet channels and said pressure-responsive valve actuating means, said pressure-sensitive element being responsive to a ratio between compressor inlet pressure and compressor bleed pressure and being arranged to cut off pressure fluid from said particular one of said channels to said pressure-responsive valve actuating means when the ratio falls below a predetermined value, said pressure-responsive valve actuating means being responsive to fluid pressure in at least one of said channels to cause compressor bleed air to be directed into said vent outlet when pressure of the compressor bleed air is substantially less than pressure in said compressed air duct and into said compressed air duct when pressure of the compressor bleed air is greater than said predetermined value.

References Cited

UNITED STATES PATENTS

| 1,959,889 | 5/1934 | Wunsch | 137—78 |
| 3,179,356 | 4/1965 | Davies et al. | 244—23 |

FOREIGN PATENTS

| 1,449,137 | 7/1966 | France. |

MARK M. NEWMAN, Primary Examiner

D. HART, Assistant Examiner

U.S. Cl. X.R.

137—81.5; 230—114